(No Model.)
W. H. STARR.
NUT LOCK.
No. 578,369. Patented Mar. 9, 1897.
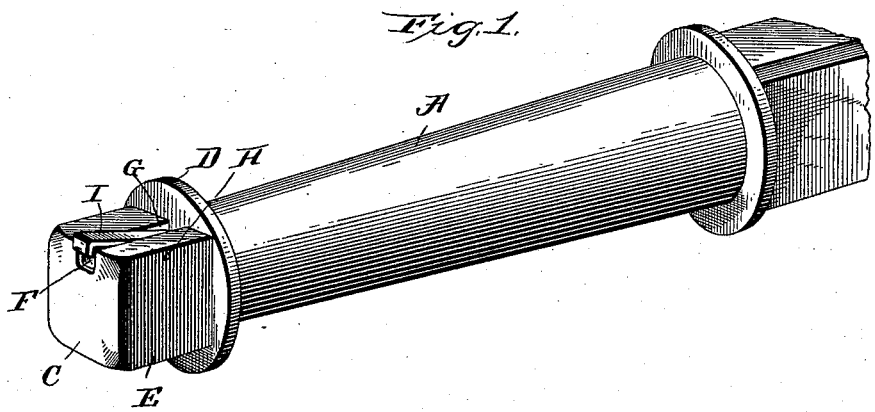
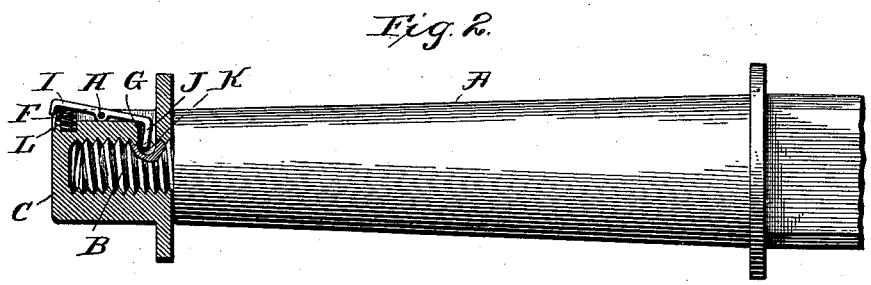
Witnesses
E. C. Wurdeman
S. S. Williamson
Inventor
William H. Starr
By Geo. H. Holgate
Attorney
THE NORRIS PETERS CO., PHOTO-LITHO., WASHINGTON, D. C.

UNITED STATES PATENT OFFICE.

WILLIAM HENRY STARR, OF LIBERTY, NEBRASKA.

NUT-LOCK.

SPECIFICATION forming part of Letters Patent No. 578,369, dated March 9, 1897.

Application filed April 6, 1896. Serial No. 586,395. (No model.)

*To all whom it may concern:*

Be it known that I, WILLIAM HENRY STARR, a citizen of the United States, residing at Liberty, in the county of Gage and State of Nebraska, have invented certain new and useful Improvements in Nut-Locks, of which the following is a specification.

My invention relates to a new and useful improvement in nut-locks, and relates especially to that class of devices adapted for use in connection with the spindles of vehicle-axles, and has for its object to provide means for preventing the accidental running off of the nut which serves to hold the hub of the wheel upon the spindle, and yet permit the removal of said nut when occasion may require without the use of tools other than the ordinary wrench, which is applied to the squared portion of the nut; and with these ends in view my invention consists in the details of construction and combination of elements hereinafter set forth, and then specifically designated by the claim.

In order that those skilled in the art to which this invention appertains may understand how to make and use the same, I will describe its construction and operation in detail, referring by letter to the accompanying drawings, forming a part of this specification, and in which—

Figure 1 is a perspective of the spindle of an axle having a nut secured thereon made in accordance with my improvement; and Fig. 2, an elevation of the same, showing the nut in section.

Referring to the drawings, A represents the spindle of a vehicle-axle of ordinary construction, which terminates in a threaded shank B, adapted to receive the nut C for the retention of the wheel upon said spindle. This nut is provided with the usual flange D and squared portion E, so that a wrench may be applied to the latter for running the nut on or off the shank.

A slot F is cut in one face of the squared portion of the nut and has leading therefrom an opening G, which passes into the interiorly-threaded portion of said nut, and in this slot is pivoted at H a lever I, one end of which is bent downward at right angles to the body thereof, so as to form a detent J, adapted to enter the recess K formed in the shank B. The outer end of this lever is normally forced outward by the spring L, seated in a suitable recess formed in the nut, and said end is bent at right angles, forming a foot to fit in a seat cut in the end of the nut to protect the groove and its contents from dirt and the like which would be likely to block the movements of the lever.

In operation the nut is applied to the shank by depressing the outer end of the lever, so as to elevate the detent out of contact with said shank, and thus running the nut on in the usual manner until the face thereof comes in contact with the shoulder formed at the juncture of the spindle and shank, at which point the detent will register with the recess, and when the lever is released this detent will drop in the recess, thereby preventing the retrograde movement of the nut.

When it is desired to remove the nut for any cause, the ordinary wrench is placed upon the squared portion thereof, and this will depress the outer end of the lever I, so as to disengage the detent from its recess, thus permitting the revolving of the nut backward without the use of an extra tool for holding the detent out of engagement with the shank.

While a wrench may be used for the removing or replacing of a nut embodying my improvement, it is also obvious that this may be accomplished without any tool at all, in that it is not necessary to force the nut tightly against the shoulder of the spindle to hold it in place, since the detent serves this purpose, and the nut therefore may be adapted to run upon the shank freely in order that it may run on or off without the use of a tool by the manipulation thereof by the fingers, and this is an advantage well recognized by those accustomed to use vehicles of all descriptions. It is also obvious that this method of locking the nut in position may be utilized for other purposes than a vehicle-nut.

Having thus fully described my invention, what I claim as new and useful is—

In a device of the character described a spindle, a threaded shank formed therewith having a recess formed near its inner end, a nut threaded thereon and having a slot on one side terminating in an opening, a spring-pressed lever pivoted in the slot, a detent formed on the inner end of the lever adapted to be normally pressed through the opening in the nut into the recess of the shank, said lever having its outer end projecting beyond the surface of the nut and a right-angular foot formed thereon adapted to protect the groove and fit in a seat formed in the end of the nut.

In testimony whereof I have hereunto affixed my signature in the presence of two subscribing witnesses.

WILLIAM HENRY STARR.

Witnesses:
 JAMES STEPHENSON,
 E. C. HINKLEY.